United States Patent [19]

Negola

[11] 4,125,380
[45] Nov. 14, 1978

[54] POLLUTION CONTROL DEVICE

[76] Inventor: Carmine Negola, 557 Willow Ave., Garwood, N.J. 07027

[21] Appl. No.: 773,521

[22] Filed: Mar. 2, 1977

[51] Int. Cl.² .......................... B01J 35/04; F01N 3/10
[52] U.S. Cl. .................................. 422/180; 60/282; 432/72; 422/171
[58] Field of Search ........ 23/277 C, 288 FC, 288 FB, 23/288 F; 110/8 A; 60/299, 282, 303; 431/7, 170; 432/72; 165/9.1; 55/DIG. 3; 106/64, 68

[56] References Cited

U.S. PATENT DOCUMENTS

| | | | |
|---|---|---|---|
| 2,084,167 | 6/1937 | Stilson | 23/277 C |
| 2,301,400 | 11/1942 | Hellan | 165/9.1 |
| 2,699,989 | 1/1965 | Houdry | 23/288 FB UX |
| 2,905,523 | 9/1959 | Houdry et al. | 23/288 FC UX |
| 3,060,043 | 10/1962 | Renkey | 106/64 |
| 3,079,267 | 2/1963 | Konrad | 106/68 X |
| 3,166,895 | 1/1965 | Slayter et al. | 23/288 FC |
| 3,226,240 | 12/1965 | Crowley | 106/64 |
| 3,227,241 | 1/1966 | Mattoon | 23/277 C |
| 3,404,965 | 10/1968 | Shiller | 60/303 X |
| 3,436,238 | 4/1969 | Criss | 106/64 |
| 3,718,489 | 2/1973 | Crookston et al. | 106/64 |
| 3,915,719 | 10/1975 | Rafine | 106/64 |
| 3,992,214 | 11/1976 | Petrak et al. | 106/64 X |

OTHER PUBLICATIONS

Refractories, Norton; Third Edition TN 677 N6; McGraw Hill Book Company, 1949.
The Technology of Ceramics and Refractories, Budnokov: TP 807 B9; The MIT Press, 1964.

*Primary Examiner*—Morris O. Wolk
*Assistant Examiner*—Michael S. Marcus
*Attorney, Agent, or Firm*—Lerner, David, Littenberg & Samuel

[57] ABSTRACT

An antipollution device for substantially reducing the carbon monoxide and hydrocarbons contained in the exhaust gases of vehicles. The device includes a container having an inlet adapted to be connected to the engine manifold of the vehicle and an outlet adapted to be connected to the exhaust pipe. The walls of the container are lined with a castable refractory material containing a binder resistant to high temperatures. The container also includes a stacked array of members formed from the refractory material. The stacked array includes at least three layers of members, with the members of adjacent layers being arranged perpendicular to each other to form passageways within the container connecting the inlet and outlet so that as exhaust gases pass through the passageways, they substantially reduce the carbon monoxide and hydrocarbons contained therein.

9 Claims, 6 Drawing Figures

POLLUTION CONTROL DEVICE

FIELD OF THE INVENTION

The present invention relates generally to antipollution devices, and specifically to an improved antipollution device for use on vehicles which operates to substantially reduce the carbon monoxide and hydrocarbons emitted from the vehicle's exhaust.

BACKGROUND OF THE INVENTION

In recent years, many different types of antipollution devices have been developed and constructed. Such antipollution devices have been installed in automobiles, factories, and other pollution-producing facilities in order to substantially reduce the noxious fumes and pollutants produced. Typically, the antipollution devices are intended to reduce or eliminate the carbon monoxide and hydrocarbons produced in automobile exhausts, and to substantially eliminate the smoke and particulate material produced by factories.

Although antipollution devices have been satisfactory to some extent, typically they have the drawbacks of being costly to build and install, and in many cases, decrease efficiency. For example, present antipollution devices used in connection with the automobile engine substantially reduce the engine's efficiency and substantially reduce the mileage obtained per gallon of gasoline.

Accordingly, it has long been desirable to construct and develop an antipollution device for use in connection with factories, vehicles, and other pollution-producing facilities, with the antipollution device being inexpensive to manufacture and install, inexpensive to maintain, and substantially reducing pollution without reducing efficiency.

Broadly, it is an object of the present invention to provide an antipollution device which satisfies one or more of the foregoing objectives. Specifically, it is within the contemplation of the present invention to provide an improved antipollution device for use in such applications as vehicles, factories, and the like, which substantially reduces pollutants in an economical and efficient manner.

It is a further object of the present invention to provide an improved antipollution device which, when installed on vehicles, substantially reduces the carbon monoxide and hydrocarbons contained in the exhaust gases.

It is a still further object of the present invention to provide an antipollution device which is simple in construction, inexpensive to build, install, and maintain, and is efficient in operation.

SUMMARY OF THE INVENTION

Briefly, in accordance with the principles of the present invention, an improved antipollution device is provided for substantially reducing the pollutants by vehicles, factories, and other pollutant-producing facilities. In one embodiment, the antipollution device of the present invention substantially reduces the carbon monoxide and hydrocarbons contained in the exhaust gases of a vehicle having a combustion engine. In this embodiment, the antipollution device includes a container having an inlet and an outlet, with the inlet adapted to be connected to the engine manifold, and with the outlet adapted to be connected to the exhaust pipe of the vehicle. The walls of the container are lined with a castable refractory material containing a binder resistant to high temperatures. The container further includes a stacked array of members formed from the refractory material. The stacked array includes a plurality of layers of the members, with the members of adjacent layers being arranged in longitudinal and transverse directions relative to the container to form passageways between the lined walls and the stacked array of members. The passageways extend between the inlet and the outlet so that the exhaust gases from the vehicle engine pass through the passageways, and the antipollution device operates to substantially reduce the carbon monoxide and hydrocarbons contained in the exhaust gases.

In another embodiment, the antipollution device of the present invention is installed in the afterburner of an incinerator and operates to substantially eliminate the smoke and particulate material produced by the incinerator. In this embodiment, the antipollution device is formed from a stacked array of members or logs, with the logs being formed from a castable refractory material containing a binder resistant to high temperatures. Again, the stacked array is formed from a plurality of layers, with the members of adjacent layers extending in transverse or longitudinal directions relative to the afterburner. In this manner, passageways are formed so that as the gases produced by the afterburner pass through the antipollution device, it operates to remove the smoke and particulate material contained therein.

In all of the applications of the present invention, the castable refractory material includes a binder resistant to temperatures up to either 2400° C. or 3400° C. One castable refractory material which has been employed in the present invention and which has produced the best results is PLICAST which is the registered trademark for a high-temperature cement produced by Plibrico Co. of Trenton, N.J. However, in accordance with the principles of the present invention, any castable refractory material having characteristics similar to that of the aforementioned PLICAST high-temperature cement could be utilized to achieve similar results.

BRIEF DESCRIPTION OF THE DRAWINGS

Further objects, features, and advantages of the present invention will become apparent upon the consideration of the following detailed description of presently-preferred embodiments when taken in conjunction with the accompanying drawings, wherein.

DETAILED DISCUSSION OF THE PREFERRED EMBODIMENTS OF THE PRESENT INVENTION

Figure 1:
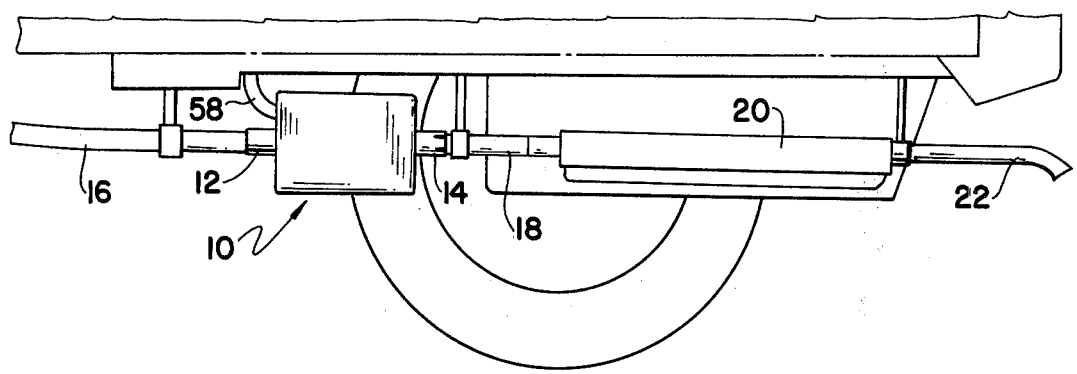
FIG. 1 is a side elevational view illustrating the installation on an automobile of the antipollution device in accordance with the present invention.

Referring now to FIG. 1, there is shown an improved antipollution device embodying the principles of the present invention, generally designated by the reference numeral 10. In this embodiment, the antipollution device is shown illustrated on a vehicle such as an automobile, but it should be understood that other applications are possible, such as in factories and the like, with these particular embodiments being only for the purposes of illustration of the principles of the present invention.

As shown in FIG. 1, the antipollution device 10 is installed on an automobile between the engine manifold and the exhaust pipe. More particularly, the device 10 includes an inlet 12 and an outlet 14, with the inlet 12 being connected to the engine manifold 16, and the outlet 14 being connected to the exhaust pipe 18, muffler 20, and tail pipe 22.

Figure 2:
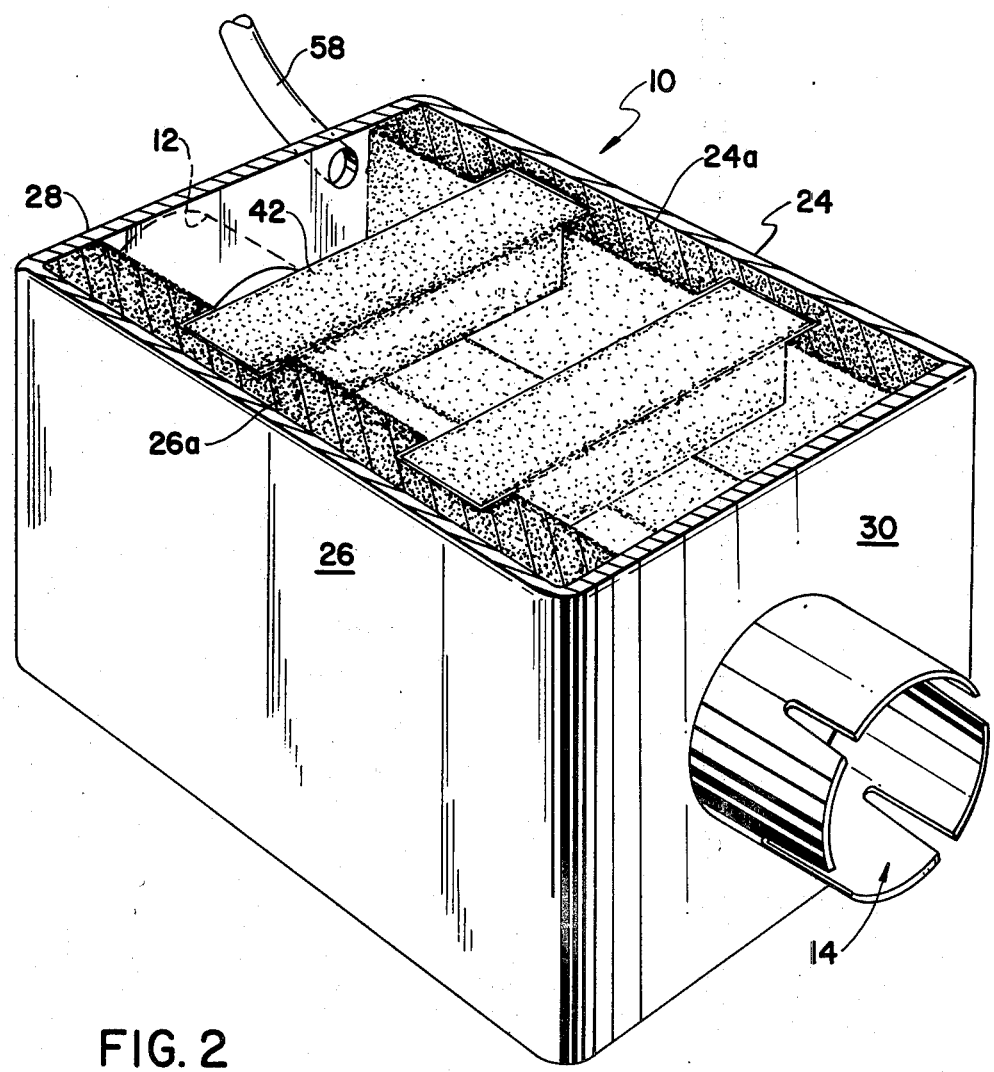
FIG. 2 is a perspective view, with the top removed for purposes of clarity, of the antipollution device illustrated in FIG. 1.
Figure 3:
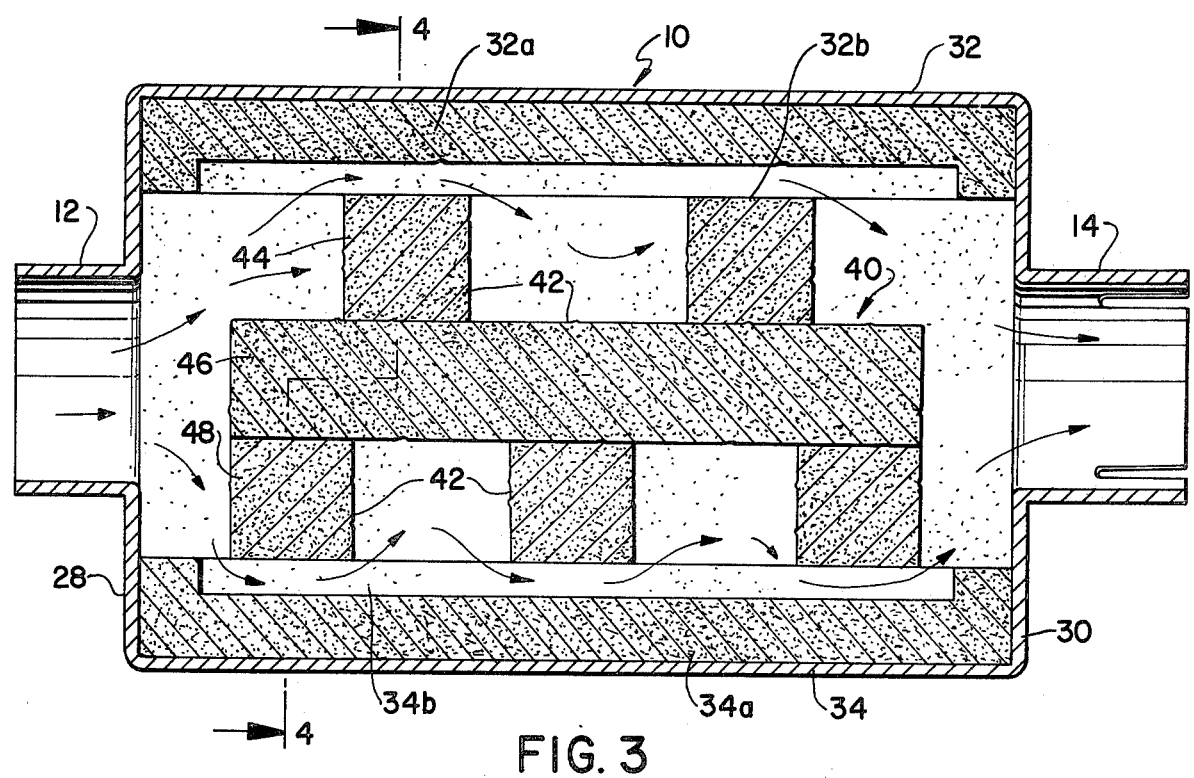
FIG. 3 is a cross-sectional view of the device shown in FIG. 2.

As shown in FIGS. 2 and 3, the device 10 is in the form of a rectangular metal box having sidewalls 24 and 26, end walls 28 and 30, top wall 32, and bottom wall 34. The sidewalls 24, 26 of the container are lined with a castable refractory material, with the sidewall linings being designated 24a, 26a, respectively. In addition, as shown most clearly in FIGS. 3 and 4, the top wall 32 is provided with a liner 32a of the castable refractory material having a recess 32b therein which, in a manner to be explained, forms a passageway. Similarly, bottom wall 34 is provided with a lining 34a of the castable refractory material having a recess 34b formed therein which cooperates, in a manner to be explained, to form a passageway.

The container 10 also includes a stacked array 40 of elongated elements or logs 42. Logs 42 are formed from the same castable refractory material as the linings and will be discussed more fully below. As will be seen in the embodiment of FIGS. 2 to 4, the stacked array 40 includes three layers: an upper layer 44, an intermediate layer 46, and a lower layer 48. In the intermediate layer 46, the log 42 is arranged in a longitudinal direction, whereas in the upper and lower layers 44, 48, the logs 42 are arranged in a transverse direction relative to the container 10. In this manner, recesses 32b cooperate with logs 42 of the upper layer 44 to form passageway 50 therebetween, and the recesses 34b cooperate with logs 42 of the lower layer 48 to form passageway 52 therebetween. In addition, as seen most clearly in FIG. 4, longitudinally-extending passageways 54 and 56 are formed on either side of intermediate element or log 42.

Figure 4:
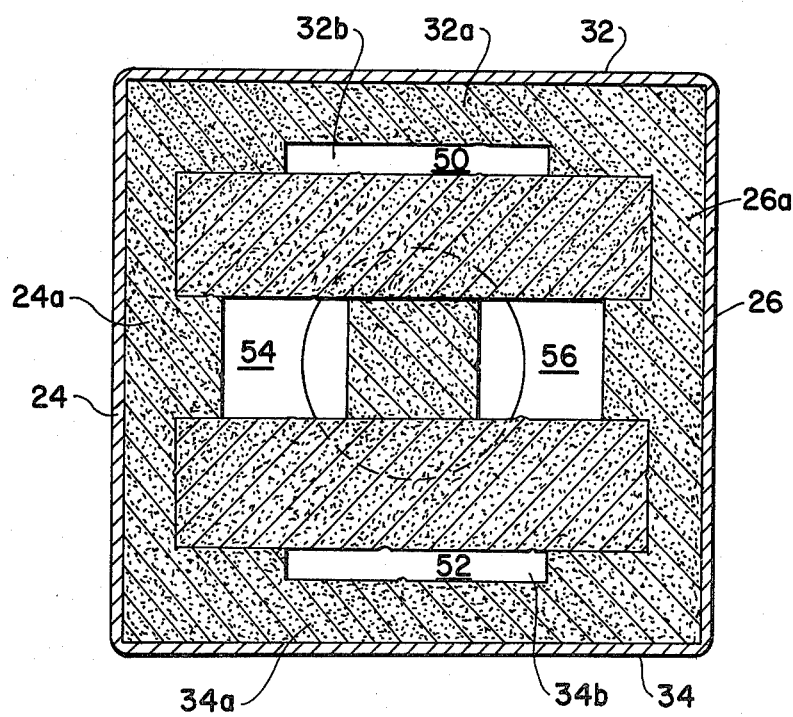
FIG. 4 is a cross-sectional view, taken along the line 4—4 of FIG. 3, illustrating the passageways formed within the device of the present invention.

As will be seen most clearly in FIGS. 3 and 4, passageways 50, 52, 54, and 56 extend between the inlet 12 and the outlet 14 so that the exhaust gases from the engine manifold 16 pass through these passageways before they are exhausted via exhaust pipe 18. In accordance with the principles of the present invention, the stacked array 40 of elements 42 operate to substantially eliminate the carbon monoxide produced and substantially reduce, to an acceptable level, the hydrocarbons contained in the exhaust gases as they pass through the passageways of the device.

The castable refractory material from which the elements or logs 42 are formed, and from which the linings 24a, 26a, 32a, and 34a are formed, will now be described. More particularly, very good results have been obtained by selecting as the castable refractory material a high-temperature cement manufactured and sold by Plibrico Co. of Trenton, N.J. The high-temperature cement includes about 42 percent alumina binder, about 39 percent silica, and about 19 percent fire clay. Such high-temperature cement may be obtained with binders resistant to a temperature of 2400° C. or approximately 3400° C. Of course, one or the other temperature range is selected depending upon the particular application and the temperatures produced within the antipollution device of the present invention. It is also possible to utilize, in accordance with the present invention, a castable refractory material containing lumnite cement or an alumina binder. Of course, in accordance with the principles of the present invention, any castable refractory material, having similar characteristics to the above-mentioned materials, may be utilized to achieve similar results.

As shown in FIG. 2, an inlet pipe 58 may be connected to device 10 in order to supply oxygen to its interior. As it is preferable that such oxygen be heated, inlet member 58 can be connected directly to the engine to receive the heated air produced therein. It has been found that adding heated air or oxygen to the antipollution device 10 further increases its efficiency.

It should also be noted that in the embodiment of FIGS. 2 to 4, elements or logs 42 are mounted within the container 10 so that logs 42 are separable from the lining material 24a and 26a. Such an arrangement allows room for expansion of the logs 42 upon being heated. In addition, such an arrangement also allows easy removal and replacement of logs 42 when it is required.

Figure 5:
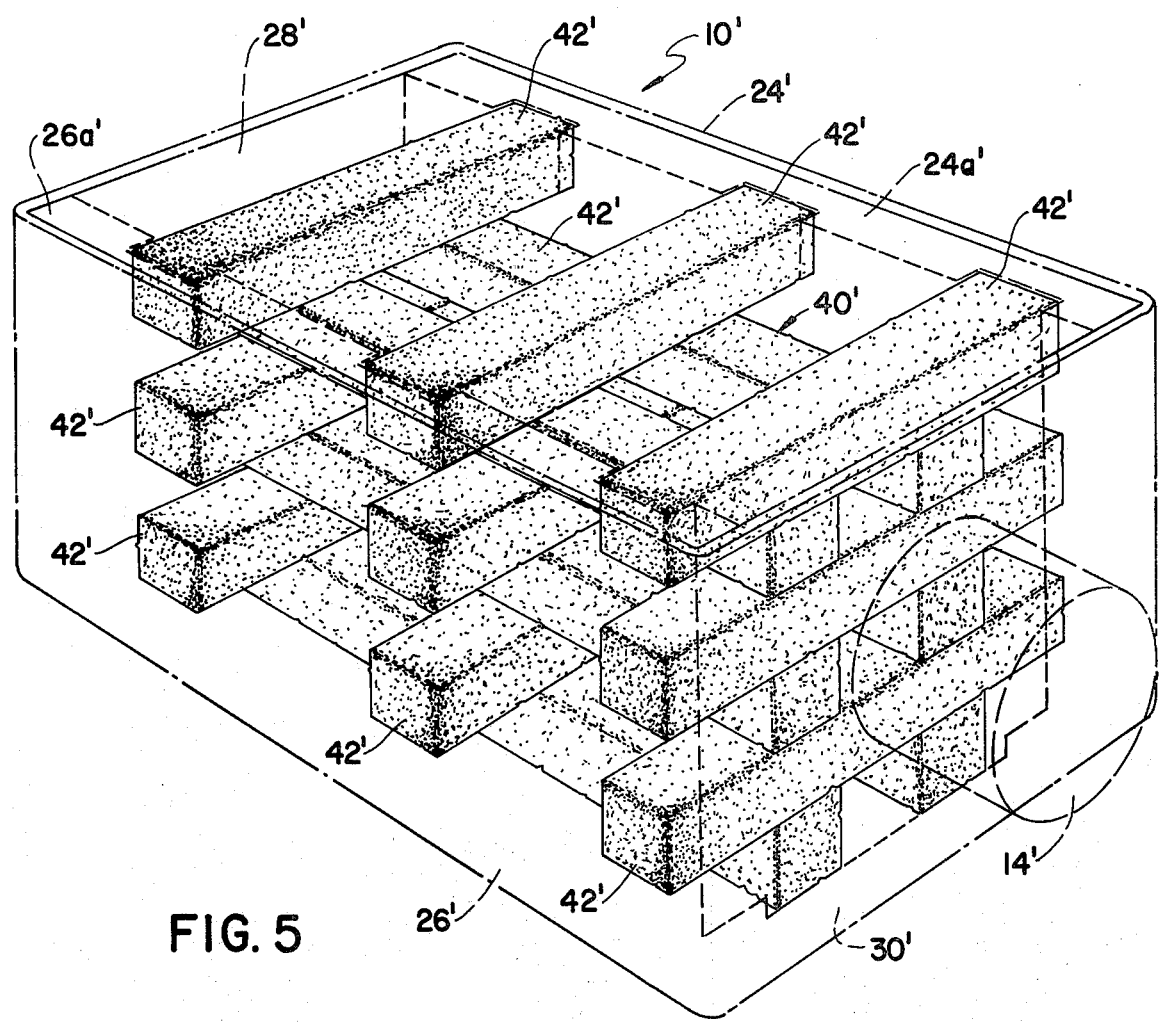
FIG. 5 is a perspective view, partially illustrated in dotted lines, showing a modified embodiment in accordance with the principles of the present invention.
Figure 6:
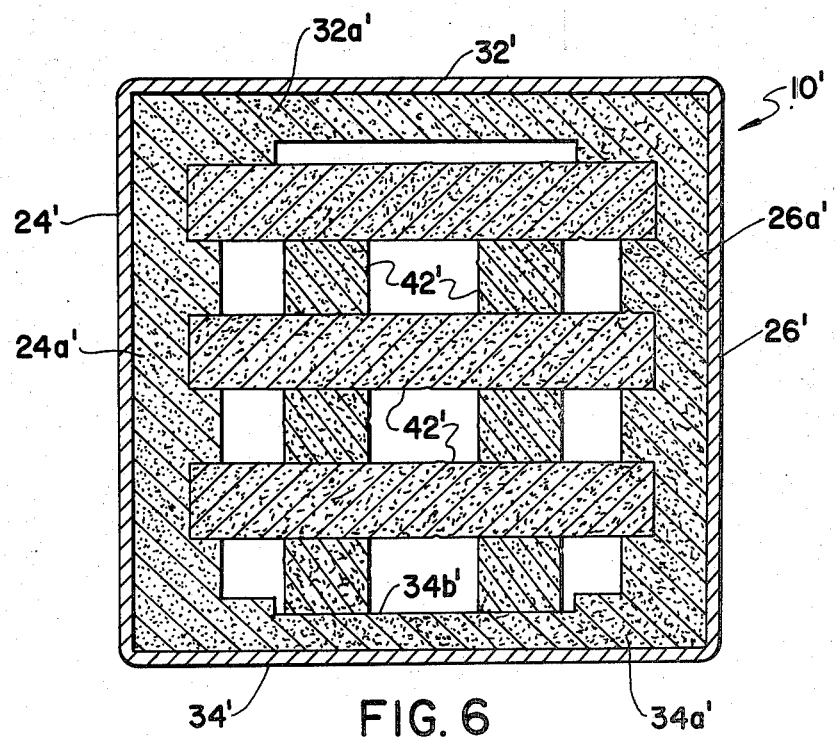
FIG. 6 is a sectional view of the modified embodiment shown in FIG. 5.

Turning now to FIGS. 5 and 6, there is shown an alternate embodiment of an antipollution device employing the principles of the present invention. In this embodiment, parts which are similar to the parts described in the embodiment of FIGS. 2 to 4 will be designated with primed numerals for ease of consideration. In the embodiment of FIGS. 5 and 6, the wall linings 24a', 26a', 32a', and 34a', as well as the logs 42', are formed of the same castable refractory material described with respect to the first embodiment. In this particular embodiment, the stacked array 40' includes six layers of elements or logs 42'. Again, adjacent layers are alternately arranged with longitudinally- and transversely-extending logs 42'. In this manner, as shown in FIG. 6, a larger number of passageways are formed between the wall linings and the logs 42', and between the logs 42' themselves. Such an increased number of passageways operates to increase the flow of gases through the antipollution device 10' and thereby increases its efficiency.

In addition, it should also be pointed out that in either of the above-described embodiments, logs 42 or 42' may be integrally formed with the material lining the walls of the container. In this manner, for purposes of ease of assembly, the wall linings and stacked array can be dropped into the container 10 or 10' as a unitary structure.

It should also be noted that in the preferred embodiment, the flow area of the container 10 or 10' should be either equal to or double the flow area of the exhaust pipe to which it is connected. In addition, the logs 42 or 42' do not have to have a square or rectangular cross-section but could also be curved or cylindrically shaped, so that the passageways formed thereby would also be curved.

It should also be understood that the antipollution device of the present invention may be installed in applications other than vehicles and automobiles. More particularly, in industrial applications, the antipollution device of the present invention may be installed, for example, in the afterburner of an incinerator which produces pollutants such as smoke and particulate material. In such installation, the walls of the afterburner would be lined with the castable refractory material in the same manner in which the containers 10 and 10', described above, are lined. In addition, a stacked array of logs 42', formed of the castable refractory material, would be disposed within the afterburner, with alternate layers of the stacked array having logs 42' longitudinally and transversely arranged to form the necessary passageways. In such an application, it has been found that antipollution device of the present invention operates to remove the smoke and particulate material from the material passing through the afterburner and through the passageways of the antipollution device. The resultant gas emitted to the atmosphere is free from smoke and particulate material.

In view of the foregoing, it should be clear that the antipollution device of the present invention has provided a simple, economical, and efficient manner for removing pollutants from vehicle and industrial applications. The device of the present invention is inexpensive to manufacture and install and is also inexpensive to maintain. Although the principles of the present invention have been illustrated as applied to an automobile, it should be clear that the present device may be installed in any application where it is desired to reduce pollutants.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An antipollution device for substantially reducing the carbon monoxide and hydrocarbons produced by the exhaust from a vehicle having a combustion engine and an exhaust pipe, comprising:

a container having an inlet and an outlet at opposite ends thereof, said inlet adapted to be connected to the engine manifold of a combustion engine and said outlet adapted to be connected to the exhaust pipe so that exhaust gases flow in a substantially longitudinal direction between said inlet and said outlet;

the walls of said container being lined with a castable refractory material containing a binder resistant to high temperature, silica, and fire clay;

said container further including a stacked array of members formed of said castable refractory material;

said stacked array including layers of members wherein alternate layers are longitudinally and transversely arranged in said container to form a grid having passageways between said lined walls and said members;

said passageways extending between said inlet and said outlet so that the exhaust gases from said engine pass through said passageways and operate to substantially reduce the carbon monoxide and hydrocarbons contained in the exhaust gases.

2. A device in accordance with claim 1 wherein said stacked array includes at least three layers of said members, at least one of said layers including members transversely arranged in said container, at least another one of said layers including members longitudinally arranged in said container, and members of adjacent layers being arranged perpendicular to each other to form said passageways.

3. A device in accordance with claim 1 wherein the sidewalls, the top wall, and the bottom wall of said container are lined with said refractory material, and the linings of said top and bottom walls each cooperating with said members to form passageways therebetween.

4. The device according to claim 1 further including means connected to said container for feeding oxygen into said container to increase the efficiency of said device.

5. The device according to claim 1 wherein said members are in the form of logs integrally formed with said material lining the walls of said container.

6. The device according to claim 1 wherein said members are in the form of logs and are separable from said material lining the walls of said container.

7. The device according to claim 1 wherein the binder of said refractory material is $Al_2O_3$.

8. The device according to claim 1 wherein said binder is resistant to temperatures up to 3400° C.

9. The device according to claim 1 wherein said refractory material includes about 42 percent of $Al_2O_3$, about 39 percent $SiO_2$, and about 19 percent fire clay.

* * * * *